United States Patent [19]

Redfield

[11] 4,117,395
[45] Sep. 26, 1978

[54] DIGITAL STROBOSCOPE-TACHOMETER

[75] Inventor: Robert H. Redfield, Evanston, Ill.

[73] Assignee: Power Instruments, Inc., Skokie, Ill.

[21] Appl. No.: 795,172

[22] Filed: May 9, 1977

[51] Int. Cl.² .......................................... F02P 17/00
[52] U.S. Cl. .............................. 324/16 T; 315/241 S; 324/169
[58] Field of Search ...................... 315/241 S; 356/23; 324/15, 16 R, 16 T, 17, 161, 169, 170; 73/116; 340/263

[56] References Cited

U.S. PATENT DOCUMENTS

| 3,573,609 | 4/1971 | Vaher | 324/17 |
| 3,693,073 | 9/1972 | Colette | 324/169 X |
| 3,781,656 | 12/1973 | Glew | 324/16 T X |
| 3,788,129 | 1/1974 | Trussell | 73/116 |
| 3,961,239 | 6/1976 | Lach | 324/15 |

*Primary Examiner*—Eugene R. LaRoche
*Attorney, Agent, or Firm*—Mason, Kolehmainen, Rathburn & Wyss

[57] ABSTRACT

A stroboscope which generates high intensity light flashes may be manually adjusted to the speed of a rotating object and provides an indication of the speed of the rotating object in revolutions per minute. Connection of an external synchronizing unit into the stroboscope automatically disables the manually-controlled oscillator and substitutes synchronizing control pulses derived from a rotating object which is to be synchronized, these control pulses occurring at a frequency which is sixty times the frequency of the rotating object.

10 Claims, 7 Drawing Figures

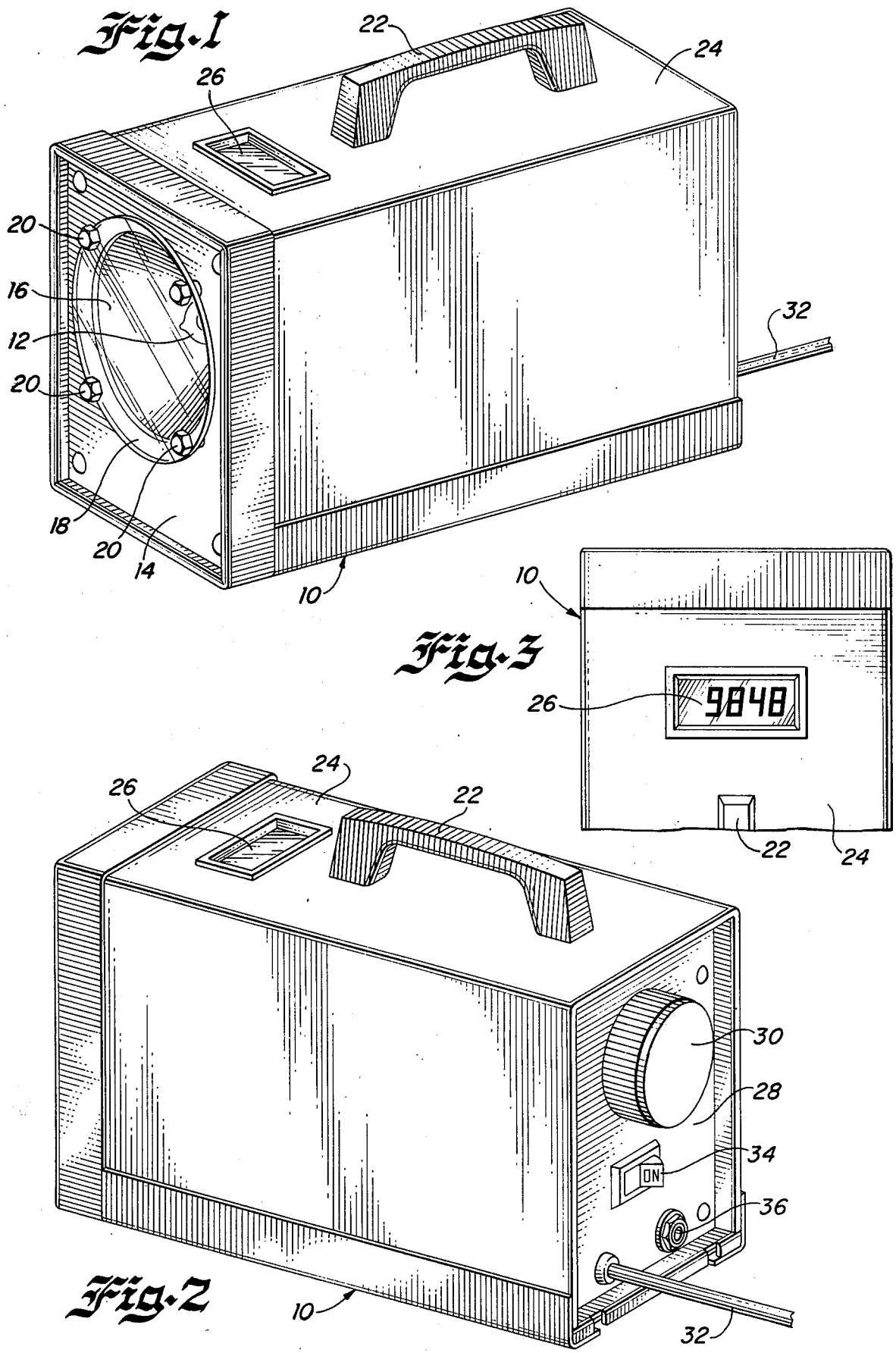

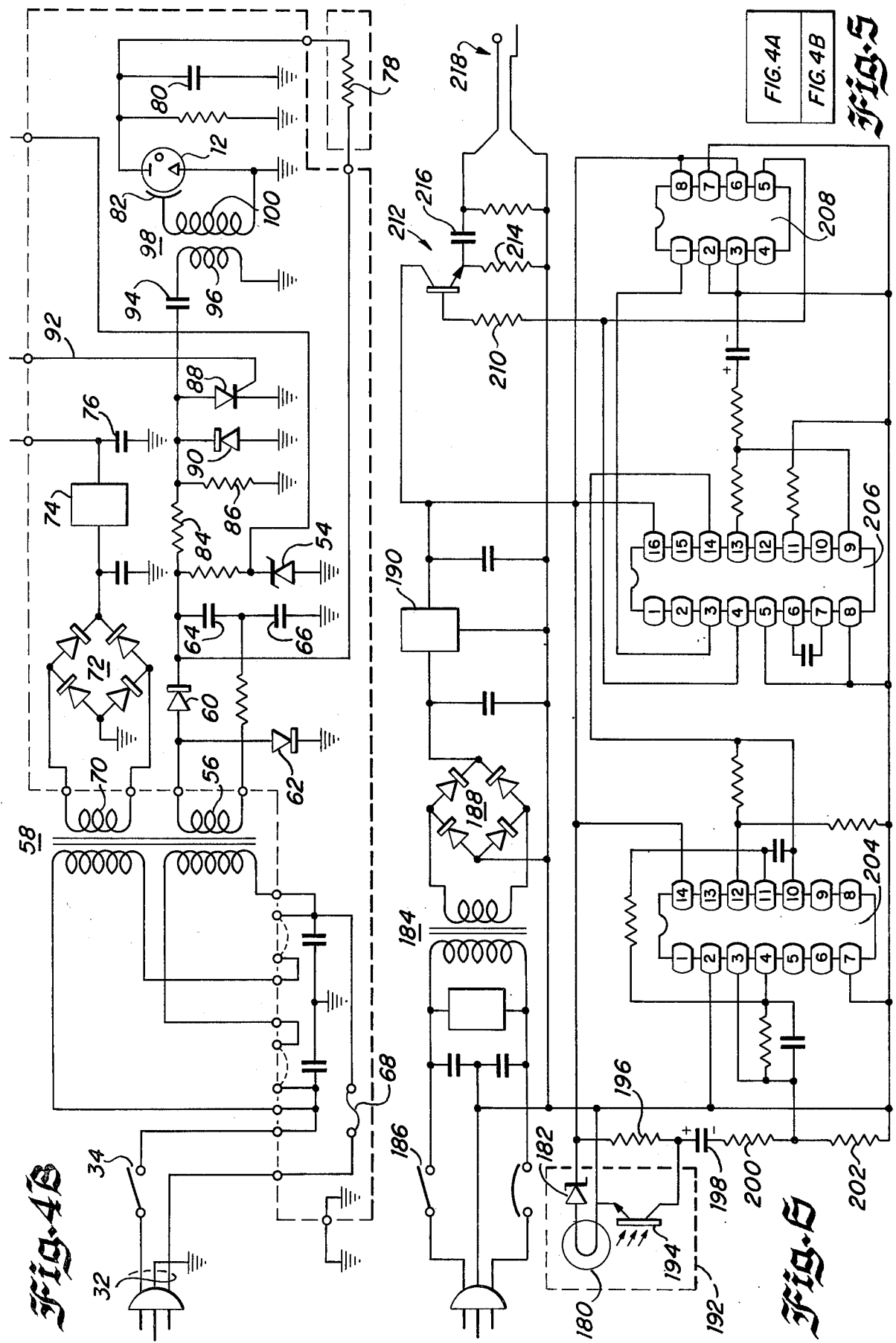

DIGITAL STROBOSCOPE-TACHOMETER

The present invention relates to stroboscopes of the type which generate high intensity light flashes for viewing a rotating object, and, more particularly, to such stroboscopes which also act as a tachometer and provide an indication of the speed of the rotating object in revolutions per minute.

While various arrangements have heretofore been proposed for providing a tachometer indication of the speed of a rotating object being viewed under the light from a stroboscope, these arrangements have been somewhat unsatisfactory in that the stroboscope with its manual control and the tachometer with its counter and display have not been provided in a self-contained unit which may be aimed in the desired direction for viewing a rotating object and the speed of the object in revolutions per minute displayed immediately in the same instrument.

Briefly, in accordance with the present invention, an elongated housing is provided in the end of which a flash lamp is mounted so that a rotating object may be illuminated by a flash lamp by aiming the housing generally in the direction of said rotating object.

A manually controllable oscillator is provided within the housing the frequency of which may be adjusted by a manual control knob on the other end of the housing, this oscillator operating at a frequency sixty times the desired flash rate of the flash lamp. The output of the oscillator is supplied to a counter within the housing which counts the number of oscillator cycles during one second under the control of a crystal controlled oscillator also included in the housing, the output of the counter being supplied to a 7-segment digital display each second to provide a digital tachometer reading in revolutions per minute. The output of the oscillator is also supplied through a frequency divider within the housing to develop control pulses at one-sixtieth the repetition rate of the oscillator signal, these control pulses being employed to control the flash lamp to emit pulses of light. By operating the manually controllable oscillator at a frequency which is sixty times the desired flash lamp rate and then dividing the output of this oscillator down by a factor of sixty to control the flash lamp, the digital display means provides a digital indication of the revolutions per minute of the rotating object which is accurate to within plus or minus one rpm. Furthermore, such an arrangement is substantially simpler than one in which the manually controllable oscillator is operated at the Desired flash rate of the flash lamp and then the oscillator output is multiplied by a factor of sixty to obtain the desired revolutions per minute.

In accordance with a further aspect of the invention, an external synchronizing unit is employed to control the flash lamp and display means within the housing so that a synchronizing signal derived from a variable speed rotating object may be employed to control the flash lamp while at the same time providing a varying digital indication of the revolutions per minute of the rotating object.

The invention, both as to its organization and method of operation, together with further objects and advantages thereof, will best be understood by reference to the following specification taken in connection with the accompanying drawings in which:

FIG. 1 is a perspective view of a digital stroboscope — tachometer embodying the features of the present invention;

FIG. 2 is a view similar to FIG. 1 but showing the rear end of the unit;

FIG. 3 is a fragmentary plan view of the unit of FIG. 1;

Figure 4A:
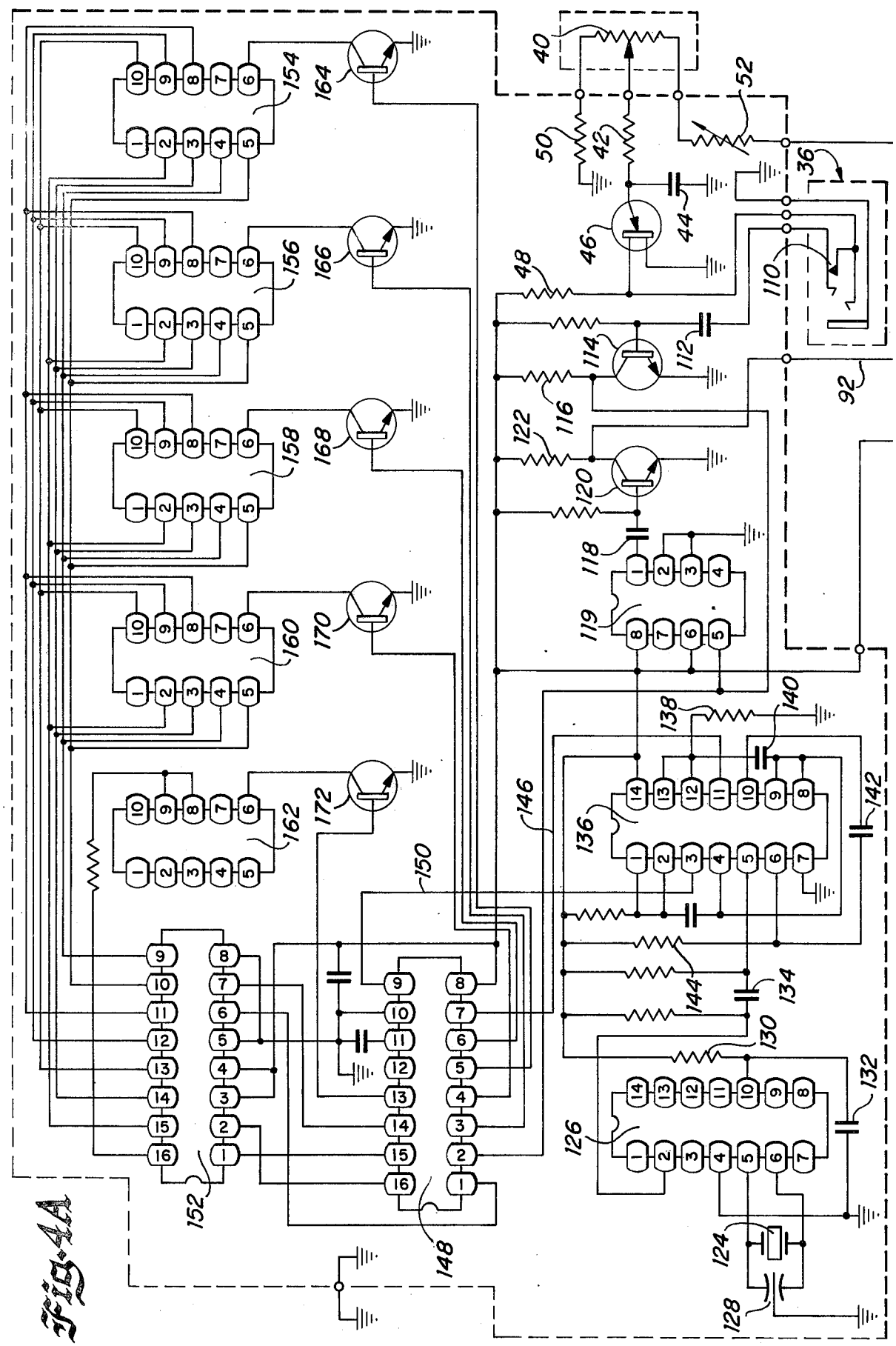

FIGS. 4A and 4B, when assembled in the manner shown in FIG. 5 comprise a circuit diagram of the electronic circuitry in the unit of FIG. 1, and FIG. 6 is a circuit diagram of an external synchronizing unit which is used with the unit of FIG. 1 under certain conditions.

Referring now to the drawings and more particularly to FIGS. 1 and 2 thereof, an elongated housing indicated generally at 10 is provided to house all of the components of the digital stroboscope — tachometer of the present invention. A flash lamp 12 is mounted within the housing 10 so as to direct light flashes through an end wall 14 of the housing 10, the lamp 12 being surrounded by a suitable reflector 16 within the housing 10 and being protected by a plastic window 18 which is secured to the end wall 14 by means of the screws 20. A handle 22 on the top wall of the housing 10 is provided so that the housing 10 may be aimed generally in the direction of a rotating object which is to be illuminated and light flashes from the lamp 12 will provide the desired stroboscopic effect so that the object appears to stand still.

In the top wall 24 of the housing 10 a digital display unit indicated generally at 26 is as provided, the unit 26 being arranged so that as the housing 10 is aimed at a rotating object the digital display unit 26 may be read in the direction in which the housing is aimed. On the rear wall 28 of the housing 10 a manual control knob 30 is provided for a manually controllable oscillator within the housing so that the frequency of the light flashes emitted by the lamp 12 may be varied as desired to render motionless the rotating object at which the housing 10 is aimed. A 110-volt A.C. supply is connected to the housing 10 by means of the power cord 32 and an off switch 34 is also located on the rear wall 28. An electrical receptacle 36 is also provided in the rear wall 28 to which may be supplied a signal from an external synchronizing unit, as will be described in more detail hereinafter.

Referring now to FIGS. 4A and 4B wherein the circuit components within the housing 10 are shown in schematic diagram form, the control knob 30 is arranged to control a potentiometer 40 which provides a variable charging potential for the series combination of resistor 42 and capacitor 44 which form the charging circuit for a uni-junction relaxation oscillator 46. The base of the uni-junction 46 is connected to the junction of the resistor 42 and capacitor 44. Gate No. 2 of the uni-junction 46 is connected to ground and Gate No. 1 is connected through the load resistor 48 to a suitable low voltage power supply, as will be described in more detail hereinafter. The potentiometer 40 is connected between a resistor 50 and a potentiometer 52 to a plus 100 volt source of voltage provided by a Zener diode 54, the potentiometer 52 providing an adjustment for the overall range of voltage provided by the operator controlled potentiometer 40.

The Zener diode 54 is energized from a separate secondary winding 56 on the power transformer 58 through a voltage doubler comprising the rectifiers 60 and 62 and the series connected power supply output capacitors 64 and 66. The power transformer 58 is energized from the power line 32 through the on off switch 34, a suitable fuse 68 being provided in series with the opposite power line conductor.

A second secondary winding 70 on the power transformer 58 is provided to energize a full wave rectifier 72 which in turn supplies a fixed voltage regulator circuit 74 so that a regulated low voltage for the transistors in the integrated circuits within the housing 10 is provided across the output capacitor 76. A relatively high voltage of plus 550 volts is developed across the series capacitors 64, 66 which is employed directly to energize the anode of the flash tube 12 through the series resistor 78. An energy storage capacitor 80 is connected from the anode of the flash tube 12 to ground to store sufficient energy to cause ionization of the lamp 12 once it is started by the external field provided by a starting electrode 82 which is outside the envelope of the flash tube 12. A voltage divider comprising the resistors 84 and 86 is connected across the capacitors 64, 66 so as to provide a voltage of approximately plus 180 volts which is supplied to the anode of an SCR 88, a diode 90 being connected across the SCR to prevent high inverse voltage being applied to the SCR 88. The SCR 88 is fired by means of control pulses supplied to the gate electrode thereof over the conductor 92 and when the SCR 88 is fired the capacitor 94 discharges through the primary winding 96 of the step-up transformer 98 so that a pulse of voltage of approximately 6,000 volts amplitude is developed across the secondary winding 100 of the transformer 98. This voltage provides a sufficiently high intensity field to cause ionization within the flash tube 12 and when this occurs the capacitor 80 is discharged through the flash tube 12 to provide a brief high intensity flash of light which is directed through the end wall 14 of the housng 10.

Considering now the manner in which the control pulses for the SCR are developed, it will be recalled from the previous general description that the uni-junction oscillator 46 is operated at a frequency 60 times the desired flash rate of the lamp 12. The output of the relaxation oscillator 46 is supplied through the normally closed contacts 110 of the receptacle 36 and through a capacitor 112 to the base of a buffer amplifier transistor 114, the emitter of which is connected to ground and the collector of which is connected through the resistor 116 to the low-voltage supply. Accordingly, amplified output pulses from the oscillator 46 at a frequency determined by the setting of the potentiometer 40 are supplied from the collector of the transistor 114 to a sixty-to-one divider integrated circuit 119 which functions to divide the oscillator pulse rate by a factor of 60. The divided pulse output from the divider 119 is supplied through a capacitor 118 to the base of a transistor 120 the emitter of which is connected to ground and the oscillator of which is connected through the resistor 122 to the low voltage supply. Accordingly, pulses at a divided rate 1/60 of the oscillator frequency are supplied over the conductor 92 to control firing of the SCR 88 in the manner described in detail heretofore. Thus, the flash tube 12 is caused to flash at a rate 1/60 that of the oscillator signal developed by the uni-junction 46. For example, if the oscillator 46 is running at a frequency of 1800 cycles per second, the divider 119 will divide this signal by a factor of 60 so that the flash tube 12 is operated at 30 flashes per second. However, the oscillator output signal is supplied to a counter which counts the number of oscillator pulses occurring during one second and displays that number which corresponds to the speed of the rotating object in revolutions per minute. Thus, when the oscillator 46 is running at 1800 cycles per second a count of 1800 is stored in the counter in one second and is then displayed as an rpm reading by the display 26.

In order to provide an accurate count of the oscillator pulses over the interval of one second, a crystal controlled oscillator is provided which includes the crystal 124 which is connected to pins 5 and 6 of an oscillator and binary divider integrated circuit 126. A two-section capacitor 128 is also connected across the crystal 124. The integrated circuit 126 also includes a $2^{22}$ binary divider, this circuit being energized from the low voltage power supplied to a resistor 130 connected to pin 10 of the circuit 126. A shunt capacitor 132 is connected from pin 10 to ground.

The oscillator portion of the circuit 126 is operated at a frequency of 4.194304 Mhz so that the output from the binary divider portion of the circuit 126 is exactly one second. This output is supplied from pin 2 of the circuit 126 as a relatively wide pulse which is supplied through the capacitor 134 to an integrated circuit 136 which comprises a series of four gates. More particularly, the circuit 136 is arranged to act as a one-shot multivibrator, the pulse width of which is controlled by the time constant comprising the resistor 138 and capacitor 140, the one-shot pulse being relatively narrow as compared to the pulse derived from the crystal oscillator circuit 126. The one-shot multivibrator pulse is differentiated by means of the circuit including the capacitor 142 and the resistor 144 and the differentiated pulse corresponding to the leading edge of the multivibrator pulse is supplied from terminal 11 of the circuit 136 and over the transfer conductor 146 to a four-decade counting circuit 148. The trailing edge of the multivibrator pulse is also employed to develop a reset pulse on pin 3 of the circuit 136 which is supplied by way of the reset conductor 150 to pin 9 of the circuit 148.

The oscillator pulses derived from the relaxation oscillator 46 are supplied from the collector of the transistor 114 directly to pin 2 of the counter 148 so that the counter 148, once it is reset, immediately starts counting these oscillator pulses. When a transfer pulse is produced on the conductor 146 at one-second intervals, the counter 148 is stopped and its count is transferred to a decoder driver circuit 152 which functions to drive a series of seven-segment digital display units 154, 156, 158 and 160.

A fifth seven-segment display unit 162 is permanently wired to indicate only a "one" and is energized from pin 16 of the circuit 152. The seven segments of the displays 154 to 160 are energized in parallel from the output terminals 9-15, inclusive, of the decoder driver circuit 152 and a series of separate control transistors 164, 166, 168, 170 and 172 are provided for the displays 154-162, respectively. A control signal corresponding to the particular decade or decades being counted in the circuit 148 is supplied to the bases of the transistors 164-170 from the output conductors 3-6 of the circuit 148. Also, an overflow pulse which is produced when the four-decade counter 148 is full is supplied by way of the terminal 13 of the circuit 148 to the base of transistor 172 so that the range of the digital display 26 is from zero to 19999. Immediately after the count in the counter 148 is transferred to the decoder driver 152, the counter 148 is reset by means of a pulse supplied over the conductor 150 so that the counter 148 is update once each second and provides a digital output corresponding to the speed of the rotating object in revolutions per minute which is accurate to plus or minus one rpm.

As discussed generally heretofore, the digital stroboscope — tachometer of the present invention is also capable of operating with an external synchronizing unit so that the light flashes from the flash tubes 16 are maintained at synchronism with a rotating object even though the speed of this rotating object varies over a quite wide range. Under these conditions the manually controllable oscillator 46 is disabled by insertion of the output plug from the external synchronizing unit into the receptacle 36. This external synchronizing unit is shown in detail in FIG. 6 of the drawings. Referring to this figure, the external synchronizing unit includes a suitable light source 180 the filament of which is connected in series with a Zener diode 182 to a plus 6-volt potential source. This source is developed from a power transformer 184 which is energized from A.C. line through an on off switch 186 and supplied A.C. voltage to a bridge rectifier 188 the output of which is supplied to a 6-volt regulating circuit indicated generally at 190. The light source 180 forms a part of a co-axial photoelectric pickup unit indicated generally at 192 which is usually connected to the synchronizing unit through a flexible cable. The probe 192 also includes a photosensitive transistor 194 which is arranged along the ray axis of the outgoing light from the lamp 180 so that only a single lens is employed for both the outgoing light from the lamp 180 and the re-entrant light which is reflected from the rotating object, as will be readily understood by those skilled in the art.

The signal produced across the load resistor 196 of the light probe unit 192 within the synchronizing unit itself is supplied through a capacitor 198 when a voltage divider comprising the resistors 200 and 202 to pin 3 of an integrated circuit 204 which acts as an amplifier for the signal developed by the probe 192. Accordingly, at pin 10 of the circuit 204 an output signal is provided in the form of pulses which recur at the rate of the rotating object which is being illuminated by the lamp 180. These pulses developed by the amplifier 204 occur at the speed of the rotating object which in the above-described example was thirty pulses per second (1800 rpm). On the other hand, the manually controllable oscillator 46 is operated at a frequency sixty times the desired flash rate of the tube 16. If the external synchronizing unit is to be employed in place of the manually controllable oscillator 46 in the digital stroboscope — tachometer 10, it is necessary to provide a multiplication of the input pulses from the probe unit 192 by a factor of 60. This is accomplished by means of a phase lock loop integrated circuit 206 which includes a voltage controlled oscillator and a comparator. One input of the comparator is supplied with amplified pulses from the probe unit 192 which are supplied from pin 10 of the circuit 204 to pin 14 of the circuit 206. However, the voltage controlled oscillator portion of the circuit 206 is first supplied from pin 4 of the circuit 206 to pin 5 of a pulse divider circuit 208 which divides the oscillator pulses by a factor of sixty. Accordingly, the oscillator portion of the circuit 206 is operated at a frequency sixty times the input pulses from the probe 192. However, the divided output from the divider circuit 208 is supplied by way of pin 1 of this circuit to pin 3 of the phase lock loop circuit 206 so that the output from the oscillator portion of the circuit 206, after being divided by a factor of sixty, is compared with the input pulses from the amplifier circuit 204. The phase lock loop circuit 206 produces a filtered correction signal which is supplied to the oscillator portion of the circuit 206 to maintain the oscillator frequency in synchronism with pulses from the light probe 192 although this oscillator is operating at a frequency sixty times the frequency of the probe pulses.

The oscillator pulses which are produced at a freqency sixty times the light probe pulses are then supplied by way of a resistor 210 to the base of an emitter follower transistor 212 so that these oscillator pulses are developed at low impedance across the emitter resistor 214 thereof. The pulses produced across the resistor 214 are coupled through a capacitor 216 to a plug 218 which is arranged to be inserted into the receptacle 36 on the rear wall of the housing 10.

When the plug 218 is inserted into the receptacle 36 the contacts 110 within this receptacle are opened so that the connection between Gate No. 1 of the uni-junction 46 and the capacitor 112 is broken. Also, as soon as the plug 218 is inserted into the receptacle 36 the sleeve thereof grounds the Gate No. 1 of the uni-junction 46 so as to render the manually controllable relaxation oscillator inoperative. When the plug 218 is inserted into the receptacle 36 the oscillator pulses from the external synchronizing unit which are developed by the emitter follower 212 at a frequency sixty times greater than the frequency of pulses derived from the rotating object by means of the light probe 192, is supplied to the capacitor 112 in place of the manually controllable oscillator 46. These oscillator pulses are then supplied to the divider 116 where they are divided back down by a factor of sixty and control the emission of light flashes from the flash lamp 12. These oscillator pulses from the external synchronizing unit are also supplied directly to the four-decade counter unit 148. The crystal oscillator circuit 126 continues to function during an external synchronizing operation and controls the counter 148 so as to count the number of pulses occurring during one second, this number then being digitally displayed on the display units 154-162, inclusive, in the manner described in detail heretofore.

By way of illustration, and without limitation to the specific circuit shown and described heretofore, the following integrated circuits may be employed in the circuits of FIGS. 4A, 4B and 6:

Circuit 126 — Type 2TS9038 (Interstil)
Circuit 136 — Type 4011 (Motorola)
Circuits 119 and 208 — Type RED 60 (L.S.I. Computer Systems, Inc.)
Circuit 148 — Type HCTR6010 (Hughes)
Circuit 152 — Type 4511 (Motorola)
Circuit 204 — Type LM3900N (Texas Instruments)
Circuit 206 — Type 4046 (Motorola)

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a digital stroboscope - tachometer, the combination of, a housing, a flash lamp fixedly mounted in said housing and arranged to direct light flashes from one end of said housing to illuminate a rotating object when said housing is aimed generally in the direction of said rotating object, a manually controllable oscillator within said housing for developing an output signal having a repetition rate equal to the desired flash rate of said lamp measured in revolutions per minute, frequency divider means in said housing and controlled by said output signal for developing a control signal having one-sixtieth the repetition rate of said output signal, means responsive to said control signal for controlling said flash lamp to emit pulses of light at the repetition rate of said control signal, counter means in said housing, means for periodically energizing said counter means to count the repetition rate of said oscillator output signal, and display means controlled by said counter means for digitally displaying the output of said counter means in revolutions per minute.

2. The combination of claim 1, wherein said digital display is mounted in the top wall of said housing and arranged to be read in the direction in which said housing is aimed.

3. The combination of claim 1, wherein said manually controllable oscillator includes a control member positioned in the end of said housing opposite said flash lamp.

4. The combination of claim 1, which includes a light probe including a source of illumination and light detector means responsive to light reflected from a rotating member illuminated by said source with which said flash lamp is to be synchronized for developing control pulses corresponding to the rotation of said member, a voltage controlled oscillator for developing oscillator output pulses at a frequency sixty times the frequency of said control pulses, second frequency divider means controlled by said oscillator output pulses for developing a feedback signal of approximately the frequency of said control pulses, means for comparing said control pulses and said feedback signal and developing a correction voltage for said voltage controlled oscillator proportional to the frequency difference therebetween, and means for supplying said oscillator output pulses to said frequency divider and said counter means in place of said manually controlled oscillator output signal.

5. The combination of claim 1, which includes a crystal controlled oscillator, means for deriving counter control pulses from said crystal controlled oscillator which recur at one-second intervals, and means responsive to said counter control pulses for first transferring the count in said counter means to said display means and then resetting said counter means.

6. The combination of claim 5, which includes one-shot multivibrator means controlled by said counter control pulses for developing uniform pulses of relatively short duration.

7. The combination of claim 6, which includes means responsive to the leading edge of said uniform pulses for transferring the count in said counter to said display means.

8. The combination of claim 7, which includes means responsive to the trailing edge of said uniform pulses for resetting said counter means.

9. The combination of claim 4, which includes electrical receptacle means in one wall of said housing, and connector means adapted to plug into said receptacle means for supplying said oscillator output pulses to said frequency divider means and said counter means.

10. The combination of claim 9, which includes means responsive to insertion of said connector means into said receptacle means for disabling said manually controlled oscillator.

* * * * *